United States Patent [19]

Phillips et al.

[11] Patent Number: 5,283,427
[45] Date of Patent: Feb. 1, 1994

[54] NIGHT SIGHT FOR A MISSILE LAUNCHER COMPRISING AN IMAGE INTENSIFIER TUBE, A RETICLE, AND AN OBJECTIVE LENS

[75] Inventors: Earle N. Phillips, Roanoke; Mark A. Bryant, Cloverdale, both of Va.

[73] Assignee: ITT Corporation, New York, N.Y.

[21] Appl. No.: 942,351

[22] Filed: Sep. 9, 1992

Related U.S. Application Data

[63] Continuation of Ser. No. 647,544, Jan. 29, 1991, abandoned.

[51] Int. Cl.$^5$ .............................................. H01J 31/50
[52] U.S. Cl. ................................. 250/214 VT; 33/233; 359/400
[58] Field of Search ............... 250/213 VT, 214 VT; 356/141, 142, 143, 7, 251, 252, 253, 254, 255; 313/524; 33/233, 234, 235, 236, 237, 238, 239, 240, 241, 244, 246, 297, 298; 359/400, 353; 362/22, 26, 800

[56] References Cited

U.S. PATENT DOCUMENTS

| | | | |
|---|---|---|---|
| 3,831,285 | 8/1974 | Vissing | 33/244 |
| 3,999,301 | 12/1976 | Hunt et al. | 359/580 |
| 4,056,721 | 11/1977 | Chow et al. | 250/213 VT |
| 4,524,675 | 6/1985 | Durenec et al. | 33/233 |
| 4,565,428 | 1/1986 | Ardnt et al. | 359/600 |
| 4,658,139 | 4/1987 | Brennan et al. | 356/251 |
| 4,792,673 | 12/1988 | Blackler | 33/241 |
| 4,961,278 | 10/1990 | Johnson et al. | 359/353 X |
| 5,084,780 | 1/1992 | Phillips | 359/353 X |
| 5,140,151 | 8/1992 | Weiner et al. | 250/213 VT |

FOREIGN PATENT DOCUMENTS 2808043  8/1979  Fed. Rep. of Germany ...... 359/400

Primary Examiner—David C. Nelms
Assistant Examiner—John R. Lee
Attorney, Agent, or Firm—Arthur L. Plevy; Patrick M. Hogan

[57] ABSTRACT

A night sight for a missile launcher has an objective lens with a field of view of at least 22 degrees. The output image of the objective lens is intensified by a variable gain light intensifier tube and the output of the intensifier is viewed through an eyepiece. A reticle pattern etched on a glass substrate and filled with titanium dioxide is illuminated by adjustable brightness LED's positioned at points on the periphery of the substrate. The reticle is disposed between the light intensifier and the eyepiece and substantially duplicates the function of reticles used in daysights.

17 Claims, 3 Drawing Sheets

NIGHT SIGHT FOR A MISSILE LAUNCHER COMPRISING AN IMAGE INTENSIFIER TUBE, A RETICLE, AND AN OBJECTIVE LENS

This is a continuation of application Ser. No. 07/647,544 filed Jan. 29, 1991 now abandoned.

BACKGROUND OF THE INVENTION

1. Field of the Invention

The present invention relates to a missile launcher sight, and more particularly to a sight having an image intensifier providing night vision capability for use with hand held missile launchers.

2. Description of the Prior Art

The STINGER Man Portable Air Defense System (MANPADS) is a shoulder launched anti-aircraft missile which has been produced in large quantities by several manufacturers. The STINGER launcher utilizes an open sight similar to the "iron sights" on a rifle in daylight conditions (day sight) for "acquiring" aircraft targets, i.e., aiming the launcher to enable the missile's guidance system to sense and track ("lock on to") a target. The day sight, like a standard rifle sight, has a rear aperture or "peep sight" and a front aperture. To acquire a target, the front and rear apertures are aligned with the target and the missile's heat seeking guidance system is activated. Once the target is acquired and locked on to, the front sight has further alignment features which the gunner uses to elevate the launch tube and adjust for proper lead angle prior to launching the missile. The lead angle is the angular displacement of the launcher from a position of pointing at the target to a position of pointing forward of the target in its direction of movement. The object of aiming forward of the target is to allow the missile to meet the target using the shortest trajectory possible. The sight assembly described above is also used for estimating the range to an aircraft target to assist in making a launch decision and to avoid launching when the target is out of range.

The STINGER is very effective during daylight hours against both fixed wing and rotary wing targets, and has even been used successfully by third world "freedom fighters" with limited formal training in the operation and use of the system. Presently, the STINGER missile system does not have a night vision optical sight for acquisition and identification of aircraft targets. Utilization of the missile system is therefore severely restricted during the night time because of the need to positively identify targets before launch, particularly when friendly aircraft are also in the area. At night, even when no friendly aircraft are present, the gunner can only use his ears and the missile infrared sensor in a usually futile attempt to "lock-on" to an aircraft, which would typically be moving at a high rate of speed. This results in greatly reduced capability for the STINGER system during hours of darkness.

The U.S. military employs a number of fielded night vision weapon sights, such as, the AN/PVS-4 Individual Served Weaponsight for aiming rifles and other projectile weapons. The problem with the AN/PVS-4 sight is that it has insufficient field of view to implement the STINGER firing sequence with the required elevation and lead angle. The, AN/PVS-4 has a 14 degree circular field of view, whereas a minimum of about 22 degrees is required for a sight designed for the STINGER. The small field of view also inhibits the search for aircraft targets, requiring a longer period of time to search a given search area.

SUMMARY OF THE INVENTION

The problems and disadvantages associated with the conventional techniques and devices utilized to aim hand-held missile launchers are overcome by the present invention which includes a night sight for a missile launcher having an objective lens with a field of view of at least 22 degrees. A light intensifier tube positioned with respect to the objective lens to receive as input the output image of the objective lens intensifies the image. An eyepiece is used for viewing the output of the light intensifier tube. A reticle is disposed between the light intensifier and the eyepiece for use in aiming the launcher.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
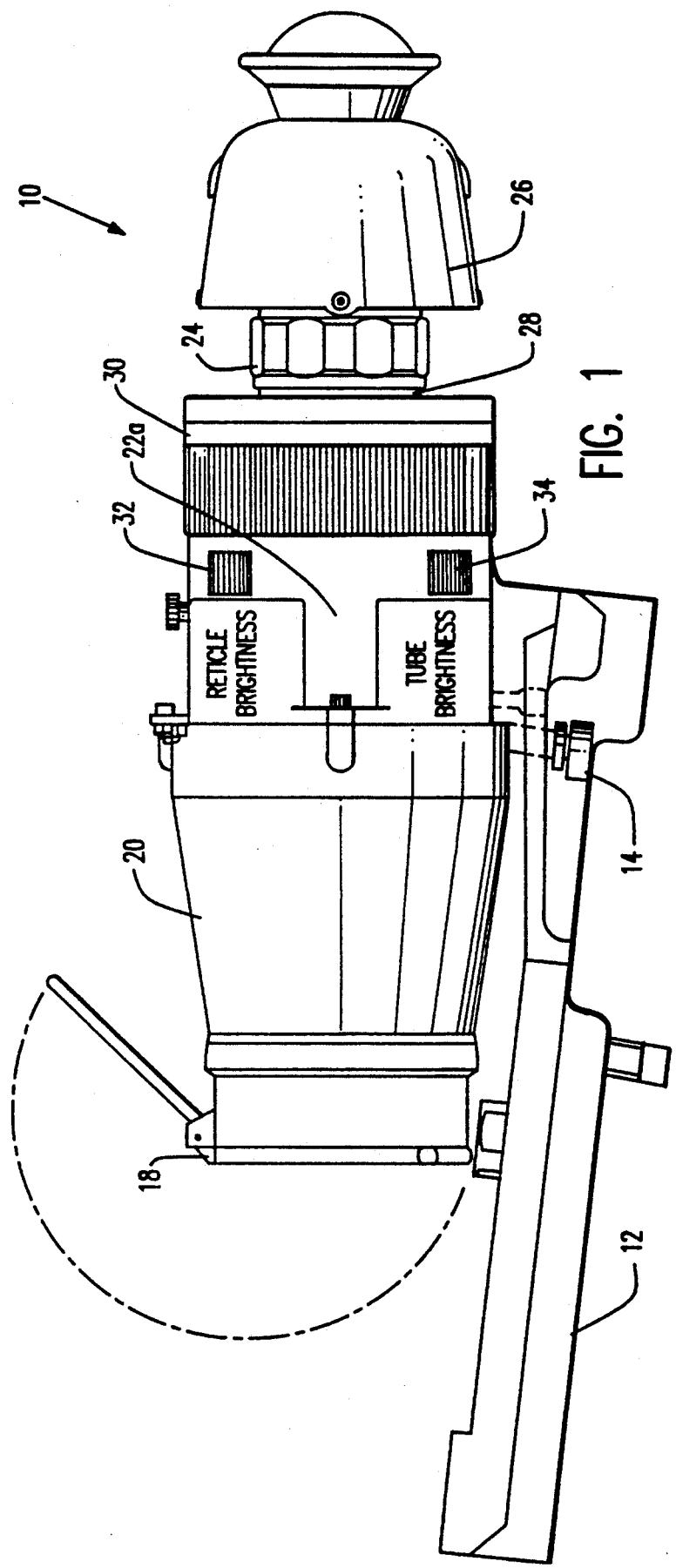
FIG. 1 is a plan view of a missile sight in accordance with a preferred embodiment of the present invention.

Referring to FIG. 1 there is shown a night sight 10 for aiming a man-portable missile launcher in accordance with a preferred embodiment of the present invention. The sight 10 may be removably connected to a missile launching tube (not shown) by a commercially available mounting bracket 12. A thumbscrew 14 secures the sight 10 to the mounting bracket 12. A flip-up lens cover assembly 18 is affixed to an objective lens assembly 20 to protect it from contamination and mechanical damage. The objective lens assembly 20 has a 60 mm focal length objective lens with 25 mm diameter format and an F/number of F/1.2. The image produced by the objective lens assembly forms the input to an image intensifier tube 22 (see FIG. 3) housed within housing section 22a which also houses batteries for powering the tube. The image intensifier tube of the exemplary embodiment is an inverting, 25 mm format, GEN III+I device. A GEN II intensifier, such as, one in accordance with military standard MX-9644, could also be used, however. An eyepiece assembly 24 is affixed to the image intensifier tube 22 for viewing the output of the tube and has mounted thereon an elastomeric eyeguard 26 to absorb shocks generated by missile launching. The gunner's left eye is shielded from missile blast gases, particulate matter and any other ejecta, by a clear polycarbonate blast shield 28 which is attached to the eyepiece assembly 24 by means of a clamp ring and locking screw. The blast shield 28 is attached to the clamp ring via a flexible neoprene rubber mount to provide a flexible mounting for the shield 28. A reticle assembly 30, as shall be described at length below, is disposed between the output end of the image intensifier tube 22 and the eyepiece assembly 24. A sight in accordance with the present invention has a wide 23.5 degree field of view and an illuminated reticle which duplicates the operation of the day sight reticle pattern familiar to daytime gunners. The illumination of the reticle pattern and the gain of the image intensifier are variable and are adjusted by external control knobs 32 and 34, respectively, for optimum target contrast under varying night sky conditions.

Figure 2:
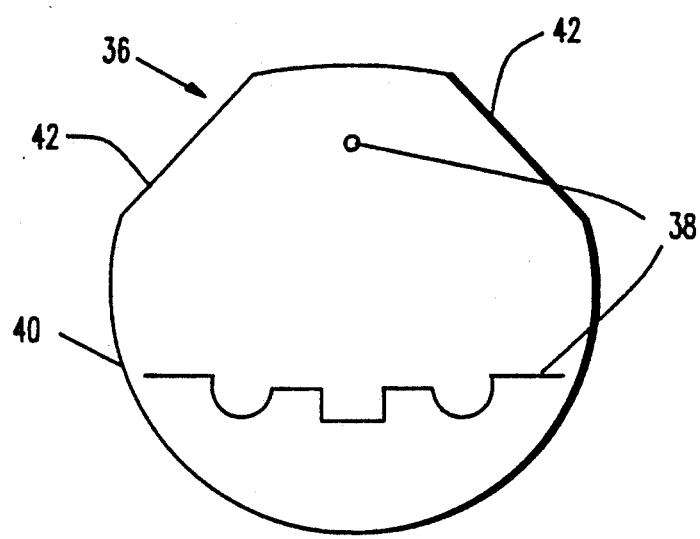
FIG. 2 is a view in elevation of a reticle which is utilized in a preferred embodiment of the present invention.

Referring now to FIG. 2, a reticle lens 36 in accordance with an exemplary embodiment of the present invention is there shown. The reticle lens 36 is essentially a clear, flat substrate through which the output of the image intensifier passes without distortion. It is preferably formed from optical crown glass type 523-586 as per military specification G-174, Grade B, Annealed. A reticle pattern 38 is etched on one surface of the reticle lens 36 and filled with Titanium Dioxide. The line width of the pattern 38 should be about 0.10 mm. Both the front and back surfaces of the reticle lens should be polished, the outer peripheral edge 40 being fine ground. The surface of the lens 36 opposite to the pattern 38 is preferably anti-reflective coated as per military specification MIL C-675. A pair of flats 42 are formed on the outer peripheral edge 40 of the reticle lens 36 to receive light from LED's positioned within the interior of the reticle assembly. Although flats are shown as the preferred indentation shape in the otherwise circular periphery, grooves or any other shape indentation could be used. The outer peripheral edge 40 of the reticle lens 36 is painted with a reflective coating, such as, white paint, to enhance the reflection of light emitted by the LED's back into the reticle lens 36. The flats 42 are not painted as they are the entry point of the light emitted by the LED's. Light from the LED's is trapped within the lens by the polished front and back surfaces and by the reflective coating on the periphery 40 of the lens 36 and thus escapes only from the etched and filled reticle pattern 38.

Figure 3:
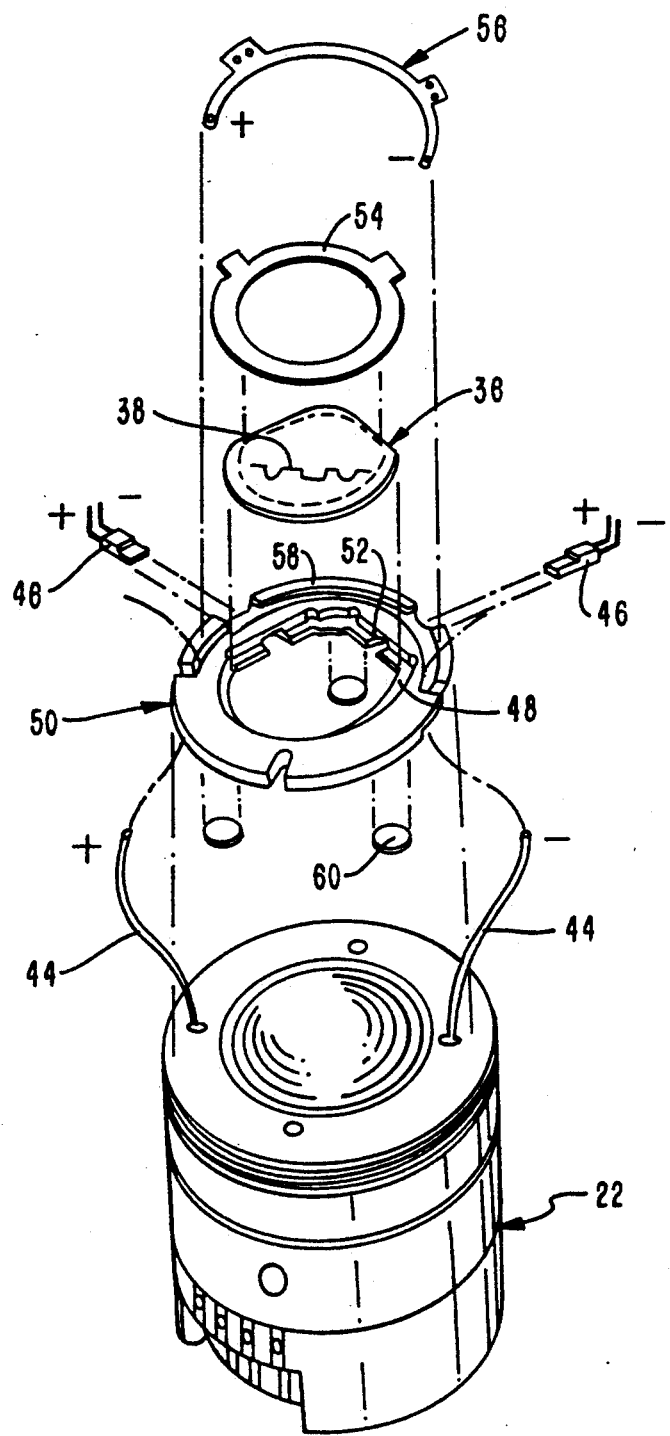
FIG. 3 is an exploded perspective view of a reticle assembly and associated image intensifier.

FIG. 3 shows the preferred apparatus for holding the reticle lens 36 in association with an image intensifier tube assembly 22. The tube assembly 22 is essentially common to the industry, however, it is adapted to be used with the present invention by the addition of two wire leads 44 which affix internally within the tube assembly 22 to a voltage source which provides power to the LED's 46 used to illuminate the reticle pattern 38. The reticle lens 36 is received in a mating recess or depression 48 formed by a retainer lip around the periphery of the central light conducting aperture of a reticle holder 50. The LED's 46 are positioned in suitable cavities 52 ground into, or otherwise formed in the reticle holder 50 at about a 90 degree separation. The use of two LED's 46 and a 90 degree separation insures uniform illumination across the reticle lens 36. The reticle lens 36 is secured to the reticle holder 50 with a light shield ring 54 having an adhesive backing. Besides mechanically holding the reticle lens 36 in the recess 48, the ring 54 prevents light emitted by the LED's 46 from radiating in a direction parallel to the axis of the tube 22 and into the viewer's eyes e.g., through the space between the reticle lens 36 and the reticle holder 50. The LED's 46 are electrically connected to the voltage supply wires 44 by means of a printed circuit board 56 in the shape of a partial ring to which the wires 44 and LED's 46 are soldered. The printed circuit board 56 also functions as a retainer ring because it is received under rim 58 and captures the ring 54 and lens 36 within the recess 48. The reticle holder 50 is affixed to the end of the intensifier tube assembly 22 by double sided tape dots 60 or other conventional means. An RTV sealant is used to secure the LED's 46 and the board 56 in position.

In operation, the reticle pattern 38 appears as a black line against the green phosphor screen when the LED's 46 are off. When power is applied to the LED's 46, the reticle pattern 38 will glow with the LED 46 color, typically red, which contrasts with the green phosphor of the tube.

The sight 10 may be stored in a shipping/mounting case with the mounting bracket 12 attached. When it is necessary to use the STINGER launcher, the gunner may then remove the sight 10 from its case and install it onto a STINGER launcher tube. The gunner installs two standard "AA" batteries in the sight 10 for power, turns on the sight 10 and the reticle 30. The sight 10 is then ready for target acquisition by the gunner. When the target is acquired, the gunner uses the special reticle design to estimate ranges and attempts to visually identify the target. If the target is identified as "hostile", the gunner activates the missile infrared seeker and listens for an audible tone which indicates that the missile has locked on to the target. The gunner then uses the reticle pattern to elevate the launch tube and adjust the lead angle prior to missile launch. Once the missile is launched, the gunner can quickly remove the sight from the used launcher and install it on the next launcher to engage additional targets.

It should be understood that the embodiments described herein are merely exemplary and that a person skilled in the art may make many variations and modifications without departing from the spirit and scope of the invention as defined in the appended claims.

We claim:

1. A night sight for a missile launcher comprising:
   (a) an objective lens having a field view of at least 22 degrees;
   (b) a light intensifier tube positioned with respect to said objective lens to receive as input the output image of said objective lens;
   (c) an eyepiece for viewing the output of said light intensifier tube;
   (d) a reticle for enabling a missile from said missile launcher to be directed at a lead angle, relative a selected moving target of up to at least 22 degrees so as to meet said selected moving target along the shortest trajectory, and
   (e) illumination means electrically coupled to said light intensifier tube, for selectively illuminating said reticle.

2. The device of claim 1, wherein said light intensifier tube is coupled to a gain adjustment means for manually controlling the gain of the output of said light intensifier tube, and said illuminated means is coupled to a manual brightness adjustment for adjusting the brightness of said reticle, thereby enabling the independent adjustment of said intensifier and said illumination means for different environmental illumination conditions.

3. The device of claim 2, wherein said reticle includes a lens having front, back and peripheral surfaces, said front surface being etched with a reticle pattern, said reticle pattern illuminable by light from said illuminating means entering at least one point on said peripheral surface.

4. The device of claim 3, wherein said reticle lens is glass and generally disk-shaped with said front and said back surfaces polished, said peripheral surface being ground, said light entering said lens at least one indentation in said peripheral surface.

5. The device of claim 4, wherein said back surface of said reticle lens is coated with an anti-reflective coating, said anti-reflective coated surface pointing in the direction of said eyepiece, said peripheral surface of said lens, exclusive of said at least one inclentation, having a reflective coating.

6. The device of claim 5 wherein said illumination means includes at least one LED positioned in proximity to said at least one indentation.

7. The device of claim 6, wherein said etched reticle pattern is at least partially filled with a light reflective material.

8. The device of claim 7, further including
(f) means for removably mounting said scope to a missile launching tube;
(g) an eye shield to protect a gunner's eye from missile ejecta on launching.

9. The device of claim 8, further including a lens cover for said objective lens.

10. The device of claim 9, wherein said reticle lens is optical annealed crown glass.

11. The device of claim 8, wherein said eye shield is a polycarbonate member affixed to a flexible neoprene mount affixed to said sight.

12. The device of claim 7, wherein said reflective material is titanium dioxide.

13. The device of claim 7, further including a reticle holder having a central aperture, a lip disposed around said aperture defining a recess for receiving and holding said reticle lens, and a pair of channels radiating from said aperture for receiving and holding a pair of said LED's in proximity to a pair of said indentations.

14. The device of claim 13, further including a light shield ring having an adhesive on one side, said ring overlapping said reticle lens and adhesively affixing to said lens and said holder, retaining said reticle lens in said recess, said ring preventing light from said LED's from radiating directly towards said eyepiece.

15. The device of claim 14, further including a printed circuit board generally in the shape of a ring segment for electrically connecting said light intensifier tube to said pair of LED's and for retaining said reticle lens in said holder by inserting into a retainer rim projecting from a surface of said holder.

16. The device of claim 4, wherein said indentation is flat.

17. The device of claim 4, wherein said indentation is curved.

* * * * *